Dec. 29, 1953
H. E. KARIG
2,664,173
METHOD OF AND APPARATUS FOR LUBRICATION
AND COOLING OF SURFACES
Filed Aug. 5, 1949
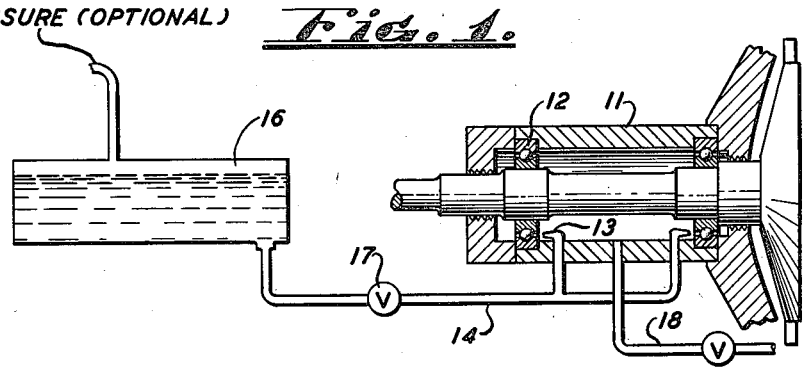
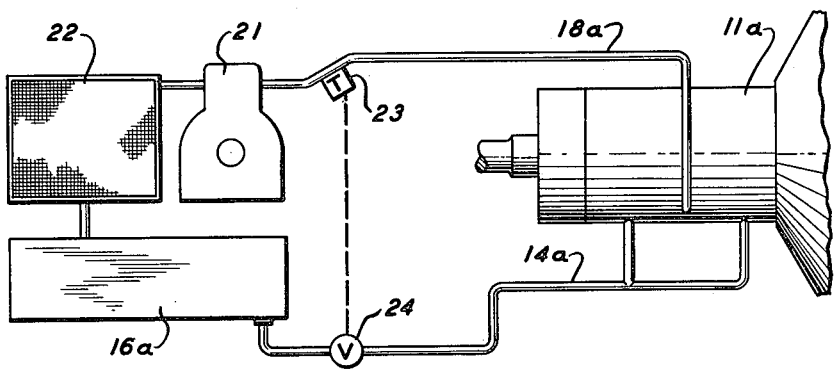
INVENTOR.
HORACE E. KARIG
BY
ATTORNEY Patented Dec. 29, 1953

2,664,173

UNITED STATES PATENT OFFICE 2,664,173

METHOD OF AND APPARATUS FOR LUBRICATION AND COOLING OF SURFACES

Horace E. Karig, Pasadena, Calif.

Application August 5, 1949, Serial No. 108,835

14 Claims. (Cl. 184—6)

(Granted under Title 35, U. S. Code (1952), sec. 266)

The invention described herein may be manufactured and used by or for the Government of the United States of America for governmental purposes without the payment of any royalties thereon or therefor.

This invention relates to a system for lubrication and cooling of surfaces, and more particularly to a system employing a lubricant containing a large amount of evaporative coolant.

It is an object of this invention to provide a closed lubrication system, wherein a bearing surface or the like may be satisfactorily lubricated and cooled with apparatus much less bulky than has previously been required.

It is another object of this invention to provide a lubrication system whereby adequate lubrication and cooling may be achieved with a much smaller flow rate of fluid than heretofore needed.

It is a further object of this invention to provide an improved lubrication method employing a smaller quantity of lubricant and less bulky apparatus than has previously been required.

Other objects and many of the attendant advantages of this invention will be readily appreciated as the same becomes better understood by reference to the following description.

The instant invention is characterized by the employment of a miscible mixture, in liquid phase, of a lubricant and an evaporative coolant, the coolant having a vapor pressure much higher than that of the lubricant. The liquid is applied through a conduit, and under pressure, to a nozzle, from which it is projected against the bearing surface to be lubricated. The sudden lowering of pressure upon the liquid causes flash vaporization of all or a substantial portion of the intermixed coolant, effecting an extremely fine atomization of the lubricant, which remains in liquid, although finely divided, state. This action thus impels, against the bearing surface, extremely fine drops of lubricant which have been cooled by the evaporation of the coolant. In this manner there is achieved extremely effective lubrication and cooling of the bearing surface, both by the cooled lubricant and by the lowering of the ambient temperature.

It is well known in the field of lubrication that only a thin film of lubricant on a bearing surface is required for the actual lubrication process. The continuous flow, in rather large volume, of lubricant which has been required in the past is needed simply to remove the heat generated by the bearing. By the employment of the liquid described herein, a much smaller volume and weight flow of liquid is required than with straight lubricant, since the latent heat of the evaporative coolant is much greater than the specific heat of the lubricant alone. In this way, vastly increased lubrication properties per pound of liquid are achieved. Furthermore, the manner of projecting the liquid against the bearing surface effects fine atomization of the liquid lubricant and enables it better to cover and lubricate the bearing surface.

A further advantage resulting from use of the instant liquid is the reduced viscosity of the mixture, which allows it to penetrate smaller clearances.

Finally, the evaporative coolant may be chosen to be a fire-inhibiting medium whose vapors suppress combustion, thereby lessening the danger from fire in the hot bearing chambers.

After being jetted against the bearing surface in the bearing housing, the mixture is recirculated and pressure reapplied thereto to reliquefy the evaporative coolant, whereupon the liquid mixture is then cooled and returned to the nozzle, and the process repeated.

Specific embodiments of the invention described above will now be described in detail with reference to the drawings, wherein:

Fig. 1 is a diagrammatic view showing a first species of apparatus for practicing the invention; and Fig. 2 is a similar view showing a second species of the invention.

A simple form of the invention is illustrated in Fig. 1, wherein 11 designates a closed casing containing a bearing surface. In this figure, the bearing surface has been illustrated as a ball-bearing 12, although it is to be understood that the term "bearing surface" used herein encompasses any form of friction-generating movement such as gears, sleeve bearings, sliding guide ways, and the like.

A nozzle 13 is mounted within the casing 11 and directed to project a spray of lubricating mixture against the bearing 12. An inlet conduit 14 is connected to supply the nozzle 13 with lubricating mixture. The lubricating mixture comprises a miscible mixture, in liquid phase, of a lubricant and an evaporative coolant, the coolant having a vapor pressure much greater than that of the lubricant. The inlet conduit 14 is supplied with lubricating mixture from a reservoir 16, and a valve 17 is placed in the line to control the flow from the reservoir 16 to the nozzle 13. Also communicating with the casing 11 is an outlet conduit 18, through which used mixture flows from the casing. The used mixture may be recompressed, cooled, and recycled in a continuous cycle, or may, if desired, be supplied directly to the fuel line of an internal combustion engine, this use being made possible if the coolant is also a combustible vapor.

In operation of the apparatus illustrated in Fig. 1, the lubrication mixture is applied through the conduit 14 to the nozzle 13, from which it is projected against the bearing 12. The sudden lowering of pressure as the mixture emerges from the nozzle 13 causes flash vaporization of a portion of the coolant in the mixture, which serves to atomize the lubricant into very fine droplets which blanket the entire bearing 12 with a fine film of lubricant, cooled by the evaporation of the coolant. The remaining, sub-cooled portion of the coolant in the mixture further evaporates on contact with bearing surfaces, thereby removing heat directly at the point of the heat generation. The ambient temperature of the bearing 12 is also cooled by the evaporation of the coolant portion of the mixture, so that the cooling per pound of lubricating liquid is much greater than is possible with ordinary lubricant, because the latent heat of the coolant is much greater than the specific heat of the oil. The used mixture (liquid lubricant and vapor coolant) is withdrawn through the outlet conduit 18, where any suitable use may be made of it as outlined above.

Somewhat more refined equipment forming a closed system is illustrated in Fig. 2, wherein the outlet conduit 18a feeds a compressor 21 which recompresses the mixture. The compressed mixture is then cooled and condensed in a cooler 22 and returned to the reservoir 16a, which feeds the inlet conduit 14a as shown.

The apparatus of Fig. 2 is readily susceptible to control through the use of a temperature-sensitive element 23, disposed in the outlet conduit 18a, which controls an expansion valve 24. As the temperature of the discharged mixture increases, the valve 24 opens wider to supply a greater flow of lubricating and cooling liquid to the bearing 12, in this way tending to make the temperature of the bearing substantially constant.

By the use of the instant method employing the apparatus described herein, the following advantages accrue. The bearing surfaces are cooled directly in a region where cooling is required, thereby reducing the possibility of scoring or melting bearings due to localized heating. The miscible nature of the lubricant and coolant, followed by the flash vaporization of the coolant, produces a fine spray or mist, which penetrates to all bearing surfaces. Bearing cooling efficiency is greatly enhanced because excessive oil is not required for cooling. This is especially important in the case of ball bearings on high speed rotating machinery where ordinary oil because of its viscosity greatly increases the friction, thereby adding to the amount of cooling required for the bearings and for the oil itself. No cooling jacket and associated cooling system around the bearing casing is required.

Use of the lubricating mixture or liquid described herein has the following advantages. Viscosity is held more nearly constant than with presently used lubricants. With an ordinary lubricant, the viscosity is relatively high as it flows into the lubricating area, i. e. against the bearing surface. This requires considerable force to force the lubricant through the inlet conduit. As the lubricant heats up against the bearing surface, the viscosity drops. With the instant mixture, the viscosity is relatively low to begin with because of the high percentage of low viscosity coolant contained in the mixture. As the mixture strikes the bearing surface, the vaporization of the coolant is completed, which would normally leave the remaining lubricant at high viscosity, but simultaneously the lubricant is being heated up, so that its viscosity per se drops. The net result is that the viscosity of the mixture remains more nearly constant than heretofore.

The lubricant is very finely atomized by the flash vaporization of the coolant component.

Increased lubrication per pound of mixture is achieved by virtue of the fact that the latent heat of the coolant is much higher than that of the lubricant alone.

By selecting a coolant whose vapors suppress combustion, the lubricating mixture may be much less susceptible of fire danger.

In practical operation, it has been found that a mixture containing, by weight, ten percent lubricant, or oil, and ninety percent coolant, or refrigerant, is satisfactory. For the lubricant, there may be chosen turbine oil having a Saybolt Universal viscosity of 300 at 100° F. The vapor pressure of such a lubricant at ordinary temperatures is negligible. That is to say, it has a flash point in the neighborhood of 300 to 500 degrees Fahrenheit. A suitable coolant is dichloro-difluoro-methane, $CCl_2F_2$ (Freon 12), which has a vapor pressure of 84.8 pounds per square inch absolute at 70° F.

Obviously many modifications and variations of the present invention are possible in the light of the above teachings. It is therefore to be understood that within the scope of the appended claims the invention may be practiced otherwise than as specifically described.

What is claimed is:

1. A lubrication and cooling system comprising a substantially closed casing, a bearing surface in said casing, a nozzle disposed to project a stream of liquid against said bearing surface, an inlet conduit connected to said nozzle feeding into said casing and containing a mixture of lubricant and vaporizable coolant, the pressure in said casing being less than that in said inlet conduit, an outlet conduit connected to said casing to remove lubricant and vaporized coolant therefrom, a compressor and cooler connected between said outlet conduit and said inlet conduit to compress the mixture and reliquefy said coolant, temperature responsive means located in said outlet conduit, and a valve in said inlet conduit connected to said temperature responsive means to be operated thereby so as to control the circulation rate of said mixture in accordance with the outlet temperature of said mixture.

2. A lubrication and cooling system comprising a substantially closed casing, a bearing surface in said casing, a nozzle disposed to project a stream of liquid against said bearing surface, an inlet conduit connected to said nozzle feeding into said casing and containing a mixture of lubricant and vaporizable coolant, the pressure in said casing being less than that in said inlet conduit, an outlet conduit connected to said casing to remove lubricant and vaporized coolant therefrom, and a compressor and cooler connected between said outlet conduit and said inlet conduit to compress the mixture and reliquefy said coolant.

3. A lubrication and cooling system comprising a closed casing, a bearing surface within said casing, a nozzle mounted within said casing directed toward said bearing surface, a source of mixed liquid coolant and liquid lubricant, said coolant having a vapor pressure substantially higher than that of said lubricant, a conduit connected from said source to said nozzle to feed the latter with said mixture, an exhaust conduit connected between said casing and source to withdraw excess liquid lubricant and vaporized coolant from said casing, a cooler in said exhaust conduit, and pressure means in said system to place the liquid mixture in said nozzle under a pressure exceeding that within said casing.

4. Method of lubrication comprising projecting a miscible mixture, in liquid phase, of evaporative coolant and lubricant against a bearing surface, effecting atomization of said lubricant thru vaporization of at least a portion of said coolant during said projecting, withdrawing excess mixture from said surface, and compressing and cooling said excess mixture to return it to liquid phase.

5. Method of lubrication comprising subjecting a miscible mixture, in liquid phase, of evaporative coolant and lubricant to a pressure substantially above atmospheric, projecting said mixture against a bearing surface, effecting atomization of said lubricant thru vaporization of at least a portion of said coolant during said projecting, withdrawing excess mixture from said surface, compressing and cooling said excess mixture to return it to liquid phase, and recirculating the reliquefied mixture.

6. Method of lubrication comprising projecting a mixture of evaporative coolant and lubricant against a bearing surface, effecting atomization of said lubricant thru vaporization of at least a portion of said coolant during said jetting, withdrawing a portion of said mixture from said surface, compressing and cooling said portion to return it to liquid phase, and recirculating the reliquefied portion along with the remainder of the mixture.

7. In a lubrication and cooling system for a bearing surface enclosed in a casing, a closed fluid circuit including a reservoir for a mixture of liquid lubricant and vaporizable coolant, an inlet conduit leading from said reservoir to said casing and formed with a nozzle directed toward and spaced from said bearing surface for projecting said mixture thereagainst, an outlet conduit for lubricant and vaporized coolant leading from the lower part of said casing to said reservoir, means including a pump for circulating said lubricant and coolant through said circuit and for maintaining the pressure in said inlet conduit high enough to reliquefy said coolant and for maintaining the pressure in said casing below the vaporizing point of said coolant, an expansion valve between said pump and said nozzle, and temperature responsive means in said outlet conduit for controlling said valve to thereby control the circulation rate of said mixture.

8. In a lubrication and cooling system for a bearing surface enclosed in a casing, a closed fluid circuit including a reservoir for a mixture of liquid lubricant and volatile coolant, an inlet conduit leading from said reservoir to said casing and formed with a nozzle directed toward and spaced from said bearing surface for projecting said mixture thereagainst, an outlet conduit for lubricant and vaporized coolant leading from the lower part of said casing to said reservoir, and a compressor and cooler in said outlet conduit to compress the mixture and reliquefy said coolant.

9. In a lubrication and cooling system for a bearing surface enclosed in a casing, a closed fluid circuit including a source of mixed liquid lubricant and volatile coolant, said coolant having a vapor pressure substantially higher than that of said lubricant, an inlet conduit leading from said reservoir to said casing and formed with a nozzle directed toward and spaced from said bearing surface for projecting said mixture thereagainst, an outlet conduit for lubricant and vaporized coolant leading from the lower part of said casing to said reservoir, and pressure means in said circuit to place the liquid mixture in said nozzle under a pressure exceeding that within said casing.

10. A lubricating and cooling system for a bearing surface enclosed in a casing, comprising means for bringing into said casing a miscible mixture of liquid lubricant and volatile coolant under sufficient pressure to maintain the coolant in liquid form, means for projecting said mixture toward said bearing surface while lowering its pressure to cause flash vaporization of at least a portion of the coolant with consequent atomization of the lubricant during such projection, means for withdrawing excess mixture from said casing, means for compressing and cooling said excess mixture to reliquefy the coolant, and means for recirculating the compressed and cooled mixture.

11. Process of lubricating and cooling a bearing surface enclosed in a casing, comprising bringing into said casing a miscible mixture of liquid lubricant and volatile coolant under sufficient pressure to maintain the coolant in liquid form, projecting said mixture toward said bearing surface while lowering its pressure to cause flash vaporization of at least a portion of the coolant with consequent atomization of the lubricant during such projection, withdrawing excess mixture from said casing, and compressing and cooling said excess mixture to reliquefy the coolant, and recirculating the compressed and cooled mixture.

12. Process of lubricating and cooling a bearing surface, comprising bringing into said casing a miscible mixture of liquid lubricant and volatile coolant under sufficient pressure to maintain the coolant in liquid form, projecting said mixture against said bearing surface while lowering its pressure to cause flash vaporization of a portion of the coolant with consequent atomization of the lubricant during such projection, withdrawing excess mixture from the vicinity of said bearing surface, compressing and cooling said excess mixture to return it to liquid phase, and recirculating the reliquefied mixture.

13. Process of lubricating and cooling a bearing surface, comprising compressing a miscible mixture of liquid lubricant and volatile coolant to maintain the coolant in liquid form, and releasing said mixture in the vicinity of said bearing surface to cause flash vaporization of a portion of the coolant with consequent spraying of the lubricant in the form of droplets upon the bearing surface.

14. Process of lubricating and cooling a bearing surface, comprising subjecting a miscible mixture, in liquid phase, of liquid lubricant and volatile coolant to a pressure substantially above atmospheric, projecting said mixture against the bearing surface at substantially atmospheric pressure to cause atomization of said lubricant through vaporization of at least a portion of said cooling during said projecting, withdrawing excess mixture from the vicinity of said surface, compressing and cooling said excess mixture to return it to liquid phase, and recirculating the reliquefied mixture.

HORACE E. KARIG.

References Cited in the file of this patent

UNITED STATES PATENTS

| Number | Name | Date |
|---|---|---|
| 1,714,184 | Moore | May 2, 1929 |
| 2,134,602 | Cohen | Oct. 25, 1938 |
| 2,225,815 | Acheson | Dec. 24, 1940 |
| 2,253,327 | Delaval-Crow | Aug. 19, 1941 |
| 2,281,648 | Wiles | May 5, 1942 |
| 2,291,166 | Maag | July 28, 1942 |
| 2,414,814 | Johnson | Jan. 28, 1947 |
| 2,443,403 | Smith | June 15, 1948 |
| 2,531,411 | Davenport | Nov. 28, 1950 |

FOREIGN PATENTS

| Number | Country | Date |
|---|---|---|
| 587,771 | Great Britain | May 6, 1947 |